US012358460B2

(12) United States Patent
Gomes

(10) Patent No.: US 12,358,460 B2
(45) Date of Patent: Jul. 15, 2025

(54) UNDER-THIGH SIDE IMPACT AIRBAG FOR A VEHICLE

(71) Applicant: GM Global Technology Operations LLC, Detroit, MI (US)

(72) Inventor: Marcelo Ferreira Gomes, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/453,670

(22) Filed: Aug. 22, 2023

(65) Prior Publication Data
US 2025/0065838 A1    Feb. 27, 2025

(51) Int. Cl.
*B60R 21/231* (2011.01)
*B60R 21/201* (2011.01)
*B60R 21/2342* (2011.01)

(52) U.S. Cl.
CPC ...... *B60R 21/23138* (2013.01); *B60R 21/201* (2013.01); *B60R 21/2342* (2013.01); *B60R 2021/23146* (2013.01)

(58) Field of Classification Search
CPC ............ B60R 21/23138; B60R 21/201; B60R 21/2342; B60R 2021/23146
See application file for complete search history.

(56) References Cited

U.S. PATENT DOCUMENTS 9,409,540 B2 * 8/2016 Fujiwara ............... B60R 21/207
11,407,335 B2 * 8/2022 Tanabe .............. B60R 21/23138
2014/0284907 A1 * 9/2014 Akiyama .............. B60R 21/201
  280/730.2
2016/0200278 A1 * 7/2016 Wiik ................... B60R 21/2342
  280/730.2
2019/0210551 A1   7/2019 Veggian et al.

FOREIGN PATENT DOCUMENTS

| DE | 102011084093 A1 | 4/2012 |
| DE | 102013017346 A1 | 7/2014 |
| DE | 102015223590 A1 | 6/2016 |

* cited by examiner

*Primary Examiner* — Jason D Shanske
*Assistant Examiner* — Matthew James O'Neill
(74) *Attorney, Agent, or Firm* — Honigman LLP; Matthew H. Szalach; Jonathan P. O'Brien

(57) ABSTRACT

An impact mitigation system for a motor vehicle includes a car seat having a seat cushion side bolster, a center console disposed adjacent to the side bolster, an airbag wrap disposed within the side bolster, and an airbag cushion operable between an un-deployed state within the airbag casing and a deployed state extending from the airbag wrap. The airbag cushion includes an outboard cushion panel extending from a proximal end of the airbag cushion at the airbag wrap to a distal end of the airbag cushion disposed at an opposite end of the airbag cushion from the proximal end. The airbag cushion further includes a plurality of inboard cushion panels extending between the proximal end and the distal end on an opposite side of the airbag cushion from the outboard cushion panel and defining a center console interface configured to mate with the center console.

2 Claims, 6 Drawing Sheets

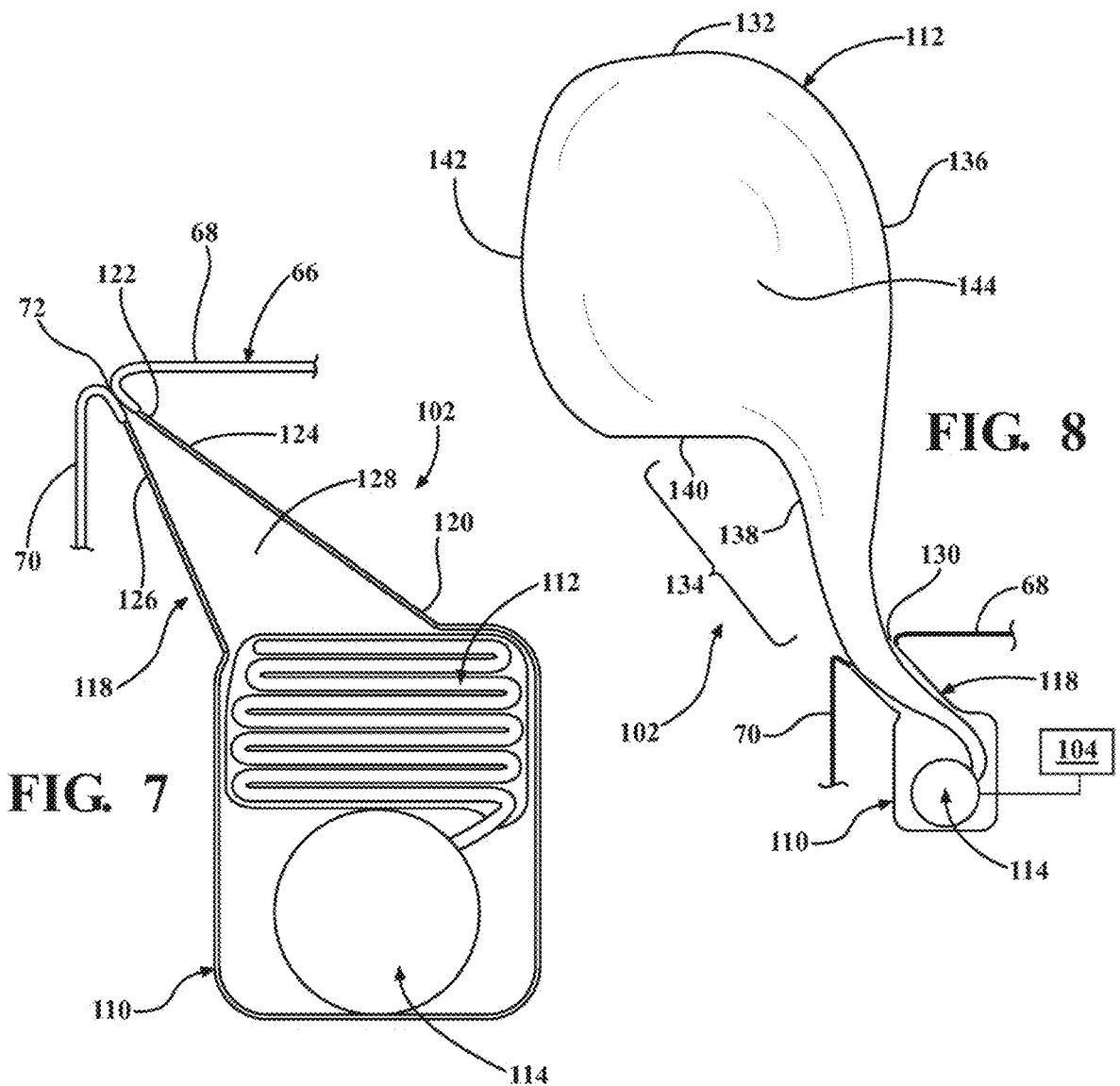
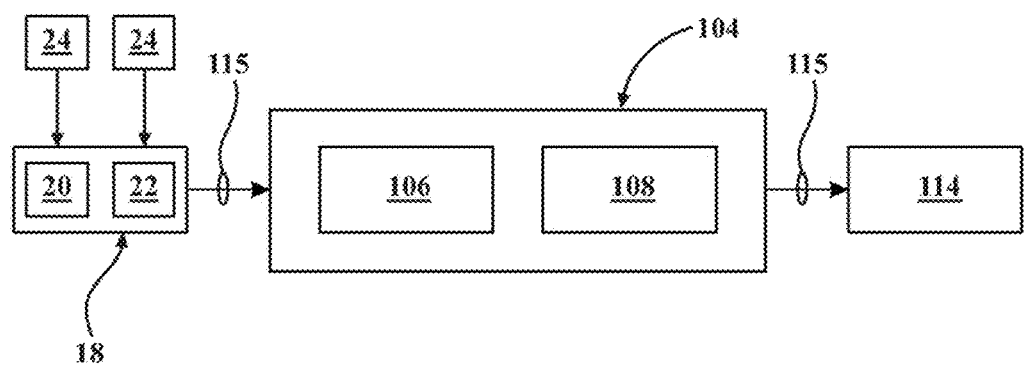

UNDER-THIGH SIDE IMPACT AIRBAG FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a side-impact mitigation system for a vehicle, and more particularly, to an under-thigh side impact airbag for a vehicle.

Motor vehicles include a number of safety systems designed to protect a driver and/or passenger during an impact. Seatbelts and supplemental restraint systems (SRS) in the form of inflatable air bags mounted in a steering wheel limit forward excursions. Side impact air bags (SIAB) may inflate to protect an occupant from side forces. Side impact air bags often take the form of curtains that extend out from either an A-pillar or a B-pillar of a vehicle exposed to side impact forces.

The side impact air bag protects an occupant from structural excursions into the vehicle and from contact with vehicle surfaces. However, the occupant may still shift out of a seat toward a center of the vehicle when exposed to a far side impact force. Shifting out of the seat towards the center of the vehicle may place undesirable stresses on the occupant.

SUMMARY

An aspect of the disclosure provides an impact mitigation system for a seat of motor vehicle. The impact mitigation system includes an airbag wrap. The impact mitigation system further includes an airbag cushion operable between an un-deployed state within the airbag wrap and a deployed state extending from the airbag wrap, the airbag cushion including (i) an outboard cushion panel extending from a proximal end of the airbag cushion at the airbag wrap to a distal end of the airbag cushion disposed at an opposite end of the airbag cushion from the proximal end, and (ii) a plurality of inboard cushion panels extending between the proximal end and the distal end on an opposite side of the airbag cushion from the outboard cushion panel and defining a center console interface configured to mate with a center console of the motor vehicle.

This aspect of the disclosure may include one or more of the following optional features. In some examples, the plurality of inboard cushion panels includes (i) a lower inboard cushion panel at the proximal end of the airbag cushion and (ii) an intermediate inboard cushion panel disposed between the lower inboard cushion panel and the distal end of the airbag cushion. In some aspects of the disclosure, the lower inboard cushion panel and the intermediate inboard cushion panel cooperate to define the center console interface of the airbag cushion. In some configurations, the lower inboard cushion panel is configured to interface with a side wall of the center console of the motor vehicle when the airbag cushion is in the deployed state. In some implementations, the intermediate inboard cushion panel is configured to interface with a top surface of the center console of the motor vehicle when the airbag cushion is in the deployed state.

In some examples, the center console interface defines a recess formed on a bottom side of the airbag cushion. In some configurations, the impact mitigation system includes a guide chute attached to the airbag wrap and configured to direct the airbag cushion to a deployment region of the seat.

Another aspect of the disclosure provides an impact mitigation system for a motor vehicle. The impact mitigation system includes a seat including a side bolster, a center console disposed adjacent to the side bolster, and an airbag wrap disposed within the side bolster. The impact mitigation system further includes an airbag cushion operable between an un-deployed state within the airbag wrap and a deployed state extending from the airbag wrap, the airbag cushion including (i) an outboard cushion panel extending from a proximal end of the airbag cushion at the airbag wrap to a distal end of the airbag cushion disposed at an opposite end of the airbag cushion from the proximal end, and (ii) a plurality of inboard cushion panels extending between the proximal end and the distal end on an opposite side of the airbag cushion from the outboard cushion panel and defining a center console interface configured to mate with the center console.

This aspect of the disclosure includes one or more of the following optional features. In some examples, the plurality of inboard cushion panels includes (i) a lower inboard cushion panel at the proximal end of the airbag cushion and (ii) an intermediate inboard cushion panel disposed between the lower inboard cushion panel and the distal end of the airbag cushion. In some implementations, the lower inboard cushion panel and the intermediate inboard cushion panel cooperate to define the center console interface of the airbag cushions. In some configurations, the lower inboard cushion panel is configured to interface with a side wall of the center console of the motor vehicle when the airbag cushion is in the deployed state.

In some examples, the intermediate inboard cushion panel is configured to interface with a top surface of the center console of the motor vehicle when the airbag cushion is in the deployed state. In some implementations, the center console interface defines a recess formed on a bottom side of the airbag cushion. In some configurations, the side bolster includes a first seat cover and a second seat cover attached together at a seam. In some examples, the impact mitigation system further includes a guide chute extending between the airbag wrap and the seam and configured to direct the airbag cushion to a deployment region of the seat.

Another aspect of the disclosure provides a motor vehicle including an impact mitigation system. The impact mitigation system includes a seat including a seat cushion side bolster, a center console disposed adjacent to the side bolster, and an airbag wrap disposed within the side bolster. The impact mitigation system further includes an airbag cushion operable between an un-deployed state within the airbag wrap and a deployed state extending from the airbag wrap, the airbag cushion including (i) an outboard cushion panel extending from a proximal end of the airbag cushion at the airbag wrap to a distal end of the airbag cushion disposed at an opposite end of the airbag cushion from the proximal end, and (ii) a plurality of inboard cushion panels extending between the proximal end and the distal end on an opposite side of the airbag cushion from the outboard cushion panel and defining a center console interface configured to mate with the center console.

This aspect of the disclosure may include one or more of the following optional features. In some examples, the plurality of inboard cushion panels includes (i) a lower inboard cushion panel at the proximal end of the airbag cushion and (ii) an intermediate inboard cushion panel disposed between the proximal end of the airbag cushion and the distal end of the airbag cushion. In some implementations, the lower inboard cushion panel and the intermediate inboard cushion panel cooperate to define the center console interface of the airbag cushion. In some configurations, the lower inboard cushion panel is configured to interface with a side wall of the center console of the motor vehicle when the airbag cushion is in the deployed state. In some examples, the intermediate inboard cushion panel is configured to interface with a top surface of the center console of the motor vehicle when the airbag cushion is in the deployed state.

BRIEF DESCRIPTION OF THE DRAWINGS

The drawings described herein are for illustrative purposes only of selected configurations and are not intended to limit the scope of the present disclosure.

FIG. 7 is an enlarged partial view of the side impact mitigation system of FIG. 1, wherein the side impact mitigation system in an un-deployed state:

FIG. 8 is an enlarged partial view of the side impact mitigation system of FIG. 1, wherein the side impact mitigation system in a deployed state; and FIG. 9 is a schematic representation of a vehicle body controller and an inflator of the side impact mitigation system of FIG. 1.

Corresponding reference numerals indicate corresponding parts throughout the drawings.

DETAILED DESCRIPTION

Figure 1:
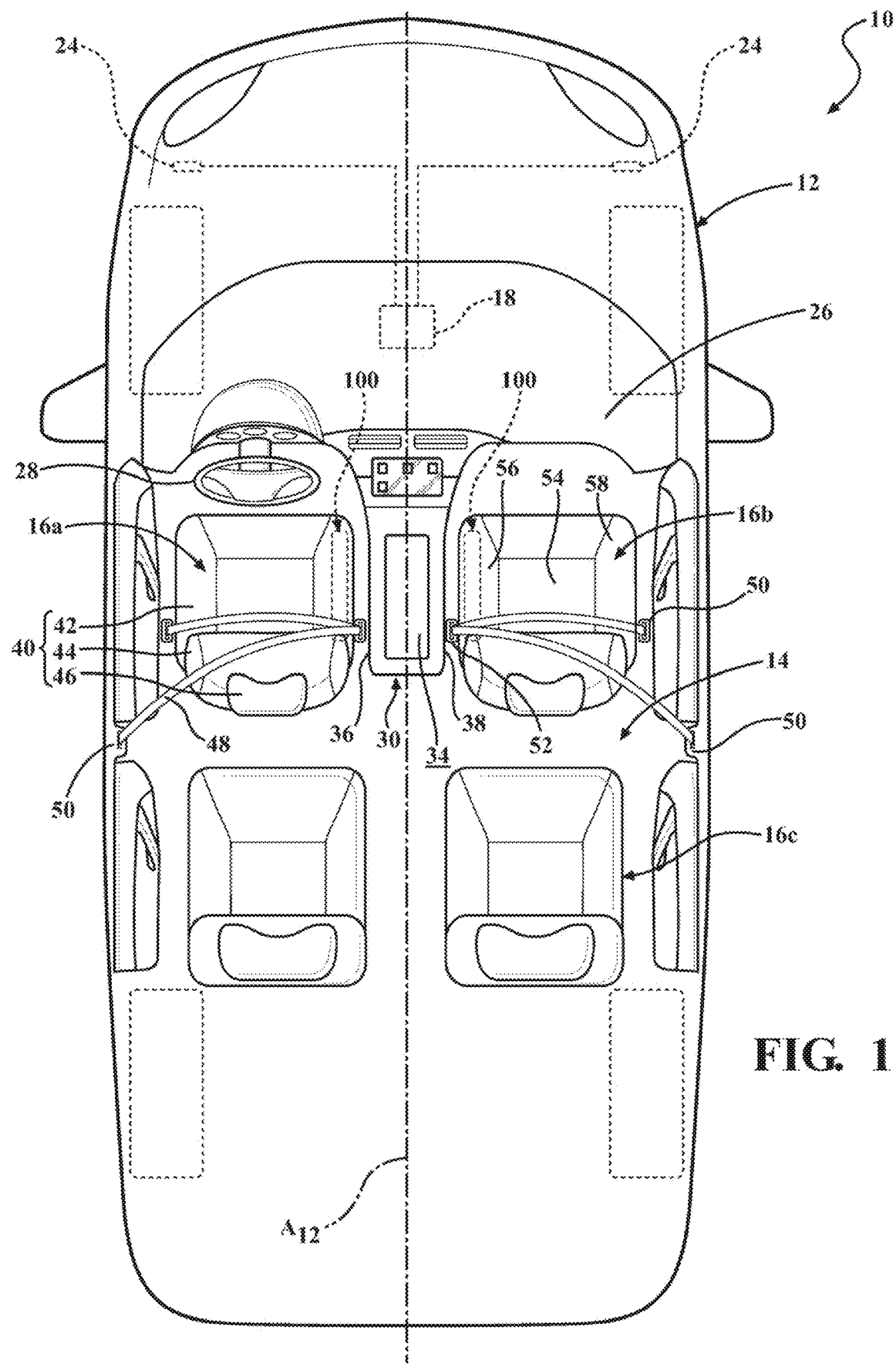
FIG. 1 is a plan view of a motor vehicle including an example of a side impact mitigation system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising." "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second." "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Figure 2:
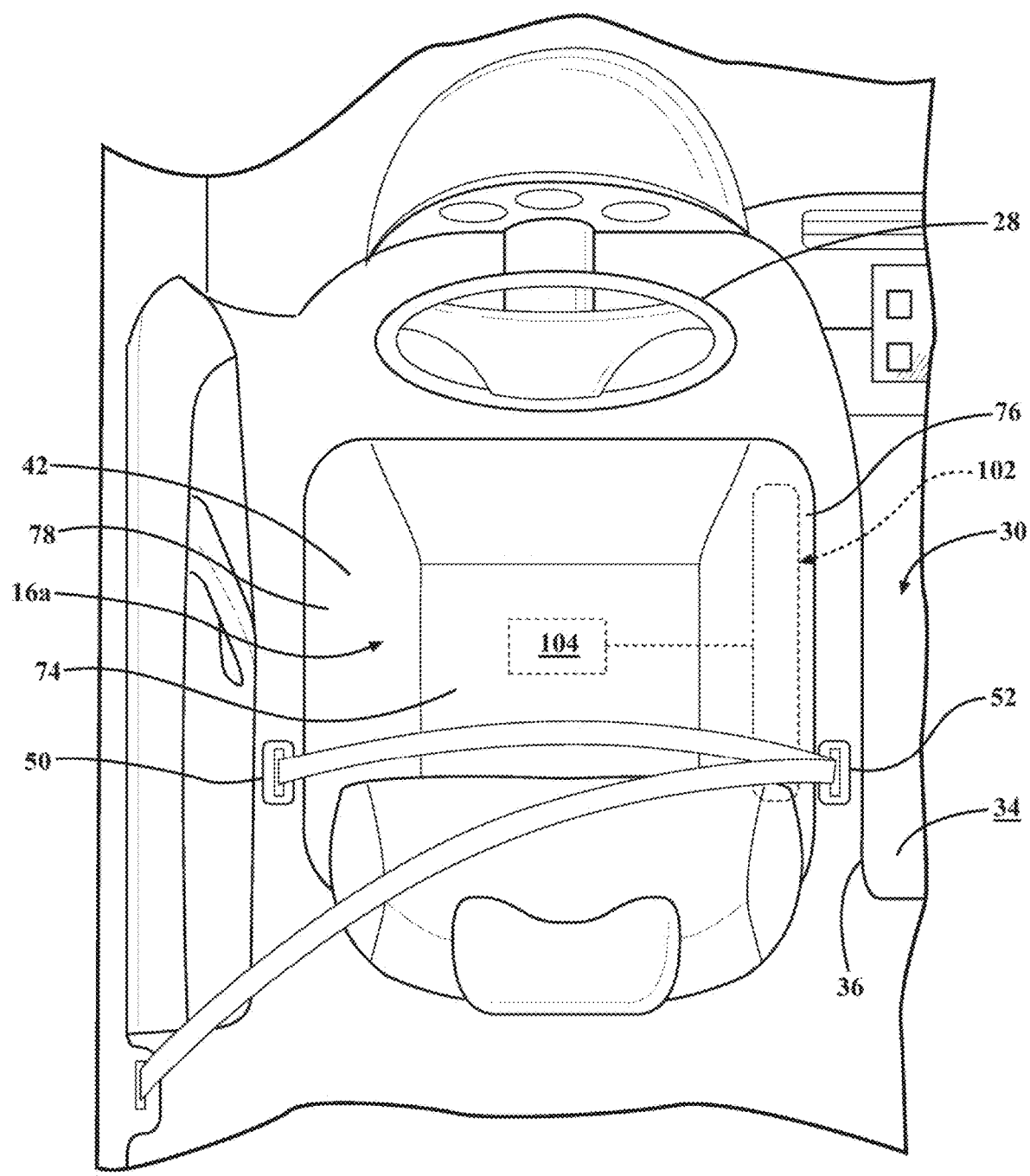
FIG. 2 is an enlarged fragmentary plan view of a passenger compartment of the motor vehicle of FIG. 1, showing a driver side passenger side front seat including the side impact mitigation system.

Referring to FIGS. 1 and 2, an example of a motor vehicle 10 including a side impact mitigation system 100 is provided. The motor vehicle 10 includes a vehicle body 12 defining a passenger compartment 14 configured to seat one or more vehicle occupants. The passenger compartment 14 includes a plurality of vehicles seats 16, 16a-16c, which include a driver side front seat 16a, a passenger side front seat 16b, and one or more rear seats 16c.

A vehicle body controller 18 is attached to the vehicle 10 of the present disclosure. The vehicle body controller 18 includes memory hardware 20 and a central processing unit 22 (FIG. 9) including a plurality of input/output ports for communicating with various peripheral devices. As shown in FIG. 1, the vehicle body 12 may include a plurality of collision sensors 24 in communication with the vehicle body controller 18 for determining when a vehicle collision or impact has occurred. The collision sensors 24 may include additional collision sensors 24 in other areas of the vehicle body 12, and may include different types of collision sensors, such as pressure sensors and accelerometers for measuring vehicle parameters associated with collision events.

As shown in FIG. 1, the passenger compartment 14 includes a vehicle dashboard 26 having a steering wheel 28 that is provided in front of the driver side front seat 16*a*. The steering wheel 28 may include an airbag (not shown) in a substantially central portion of the steering wheel 28, which deploys to restrict forward movement of the occupant at the time of a collision event.

The passenger compartment 14 further includes a center console 30 extending between the driver side seat 16*a* and the passenger side front seat 16*b*. As shown in FIGS. 1-4, the center console 30 has a height $H_{30}$ extending upwardly from a floorboard 32 of the vehicle body 12 to a console top surface 34. In the illustrated example, the center console 30 is configured as a low-profile center console 30, whereby the console top surface 34 of the center console 30 is located at a height $H_{30}$ that does not provide an armrest between the driver side front seat 16*a* and the passenger side front seat 16*b*. For example, the height $H_{34}$ of the center console may be the same as or less than a height $H_{40}$ of an adjacent portion of the driver side front seat 16*a* and the passenger side front seat 16*b*, as discussed in greater detail below. The center console 30 further includes a driver-side wall 36 extending between the floorboard 32 and the console top surface 34

Each of the front seats 16*a*, 16*b* includes a seat body 40 having a seat base 42 that supports the lower body (e.g., legs, buttocks) of an occupant O, a seat back 44 that supports the torso of the occupant O, and a headrest 46 attached to the top of the seat back 44 at a position corresponding to a head of the occupant O. Each front seat 16*a*, 16*b* is provided with a three-point seatbelt 48. Two anchor points 50 that serve as fixing points of the seatbelt 48 are respectively provided on an outboard upper end of the seat back 44 or vehicle frame and an outboard side portion of the seat base 42 or vehicle frame. A buckle 52 that serves as a fixing point of the seatbelt 48 is provided at an inboard side portion of the seat base 42. Thus, the two anchor points 50 and the buckle 52 are coupled to the seat body 40 or the vehicle body 12, so that the seatbelt 48 restrains the passenger to the seat body 40.

Figure 3:
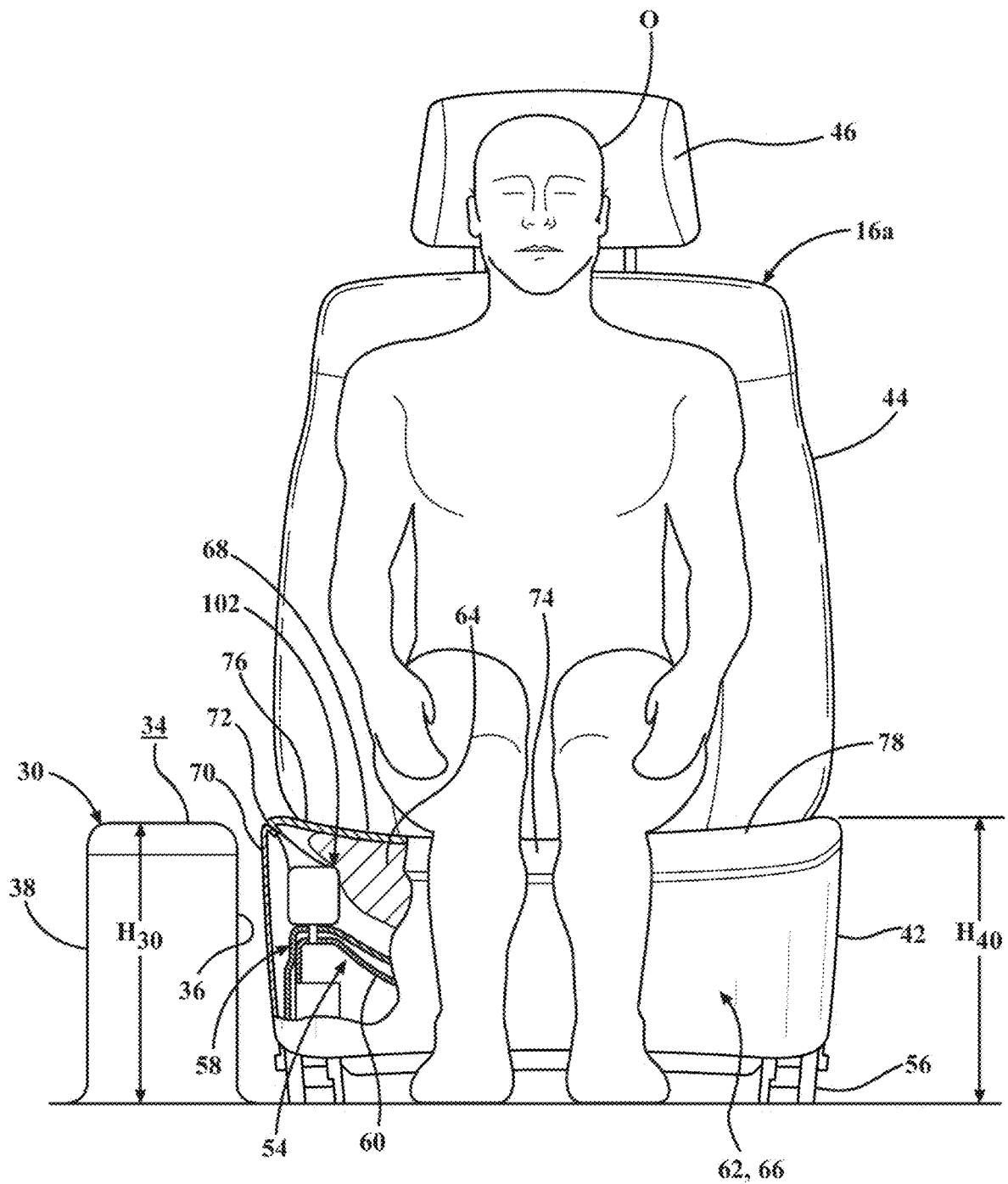
FIG. 3 is a front elevation view of the passenger compartment of FIG. 2, wherein the side impact mitigation system in an un-deployed state.

As shown in FIG. 3, the seat base 42 includes an internal seat frame 54 that provides a support structure of the seat base 42. The seat base 42 further includes a pair of left and right seat rails 56 that are attached to the seat frame 54 and extend in the fore-and-aft direction. Generally, the seat rails 56 may provide a sliding attachment interface with the seat frame 54 to facilitate fore and aft adjustment of the front seats 16*a*, 16*b*. In the illustrated example, the seat frame 54 includes respective left and right side frame members 58 and a seat pan 60 that extends between the side frame members 58.

With continued reference to FIG. 3, the seat body 40 includes a seat trim package 62 including various cushions and covers attached to the seat body 40 to provide comfort and support characteristics of the seat body 40. For example, each of the seat base 42, the seat back 44, and the headrest 46 may include one or more cushions attached to the seat body 40. The cushions are then enclosed within seat covers. Referring to FIG. 3, the seat base 42 includes a seat base cushion 64 defining a profile of a seating surface of the seat base 42. The seat base cushion 64 is enclosed within a seat base cover 66, which includes an upper seat base cover 68 and a peripheral seat base cover 70. The upper seat base cover 68 may be attached to the peripheral seat base cover 70 along a peripheral seam 72. In the illustrated example, the peripheral seam 72 includes a stitched or sewn seam between the upper seat base cover 68 and the peripheral seat base cover 70 that extends along the inboard side, the front, and the outboard side of the seat base 42.

Referring still to FIG. 3, the seat base 42 generally defines a central seat panel 74 and a pair of side bolsters 76, 78 defined by the seat base cushion 64 and the upper seat base cover 68. Generally, the central seat panel 74 provides a region of the seat base 42 for supporting vertical forces associated with the occupant O during steady-state operation (i.e., no acceleration) of the vehicle 10, while the side bolsters 76, 78 are configured to resist lateral forces applied by the lower body of the passenger during vehicle maneuvers (e.g., turns, side impacts). Thus, the side bolsters 76, 78 define a portion of the upper seating surface of the seat base 42 that extends at an oblique angle relative to the central seat panel 74. For the sake of illustration, the central seat panel 74 and the side bolsters 76 are shown as being defined by a single seat base cushion 64 and a single upper seat base cover 68. However, the seat base cushion 64 and the upper seat base cover 68 may include a plurality of cushion elements or panel elements attached or arranged to provide the central seat panel 74 and side bolsters 76.

Referring to FIGS. 1-6, each of the front seats 16*a*, 16*b* may include a side impact mitigation system 100 configured to absorb lateral forces associated with the lower body of an occupant O during a side impact event. Particularly, the side impact mitigation system 100 is configured to absorb and support the lower body of the occupant O against the center console 30 of the vehicle 10 during a far-side impact event (i.e., an impact to the opposite side of the vehicle body from the respective front seat 16*a*, 16*b*). The side impact mitigation system 100 includes an airbag module 102 disposed in an inboard one of the side bolsters 78 and an inflator 104 operable to actuate the airbag module 102 in the event of a side impact. Here, the term "inboard" refers to the side bolster 78 facing a central longitudinal axis $A_{12}$ of the vehicle body 12. Particularly, the inboard side bolster 78 is the side bolster 78 adjacent to and facing the center console 30.

Figure 4:
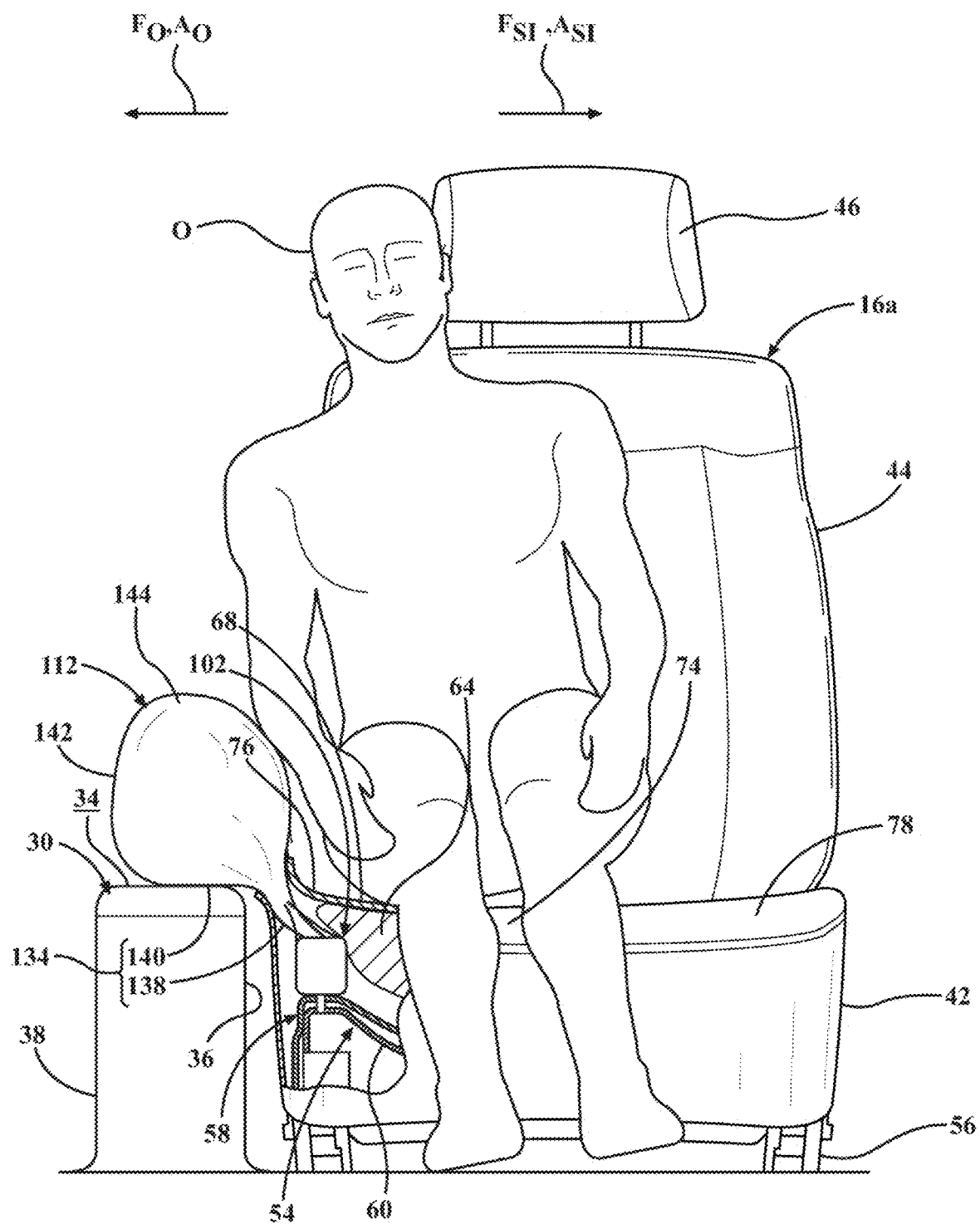
FIG. 4 is a front elevation view of the passenger compartment of FIG. 2, wherein the side impact mitigation system in a deployed state.
Figure 5:
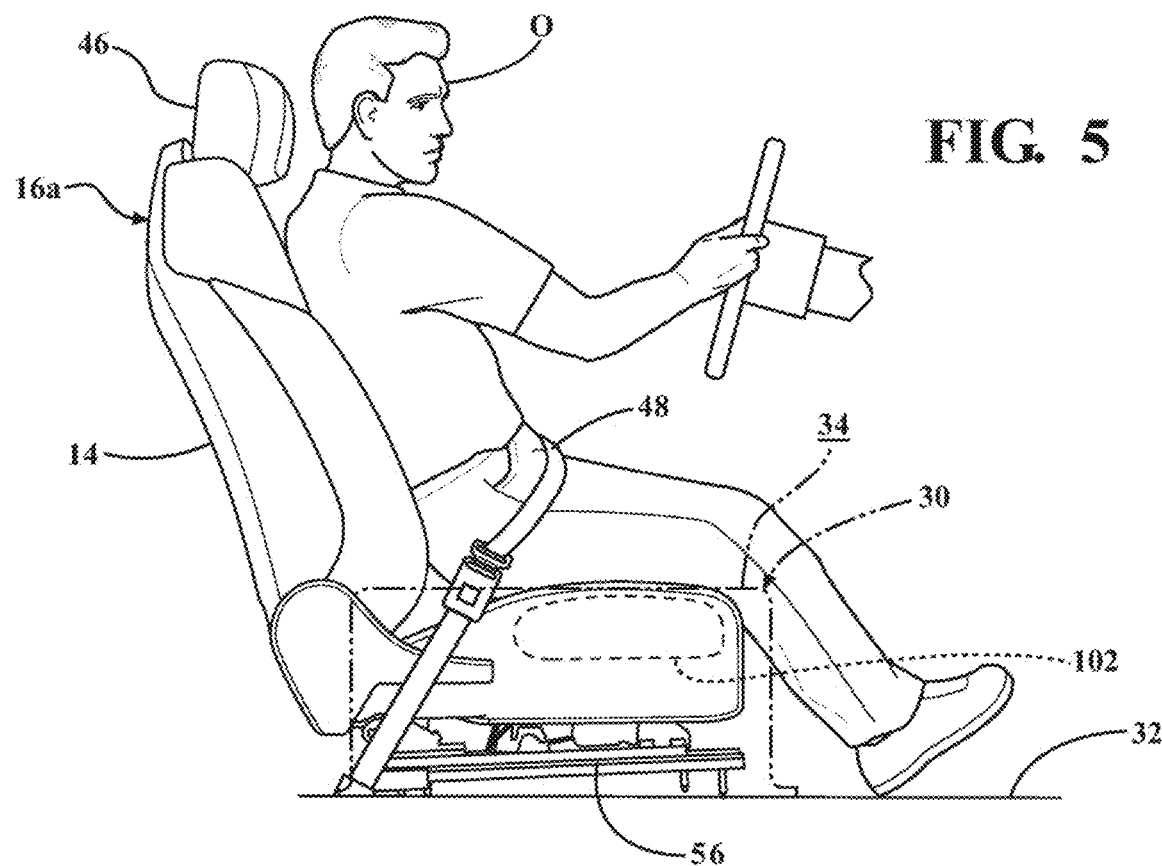
FIG. 5 is a side elevation view of the passenger compartment of FIG. 2, wherein the side impact mitigation system in an un-deployed state.
Figure 6:
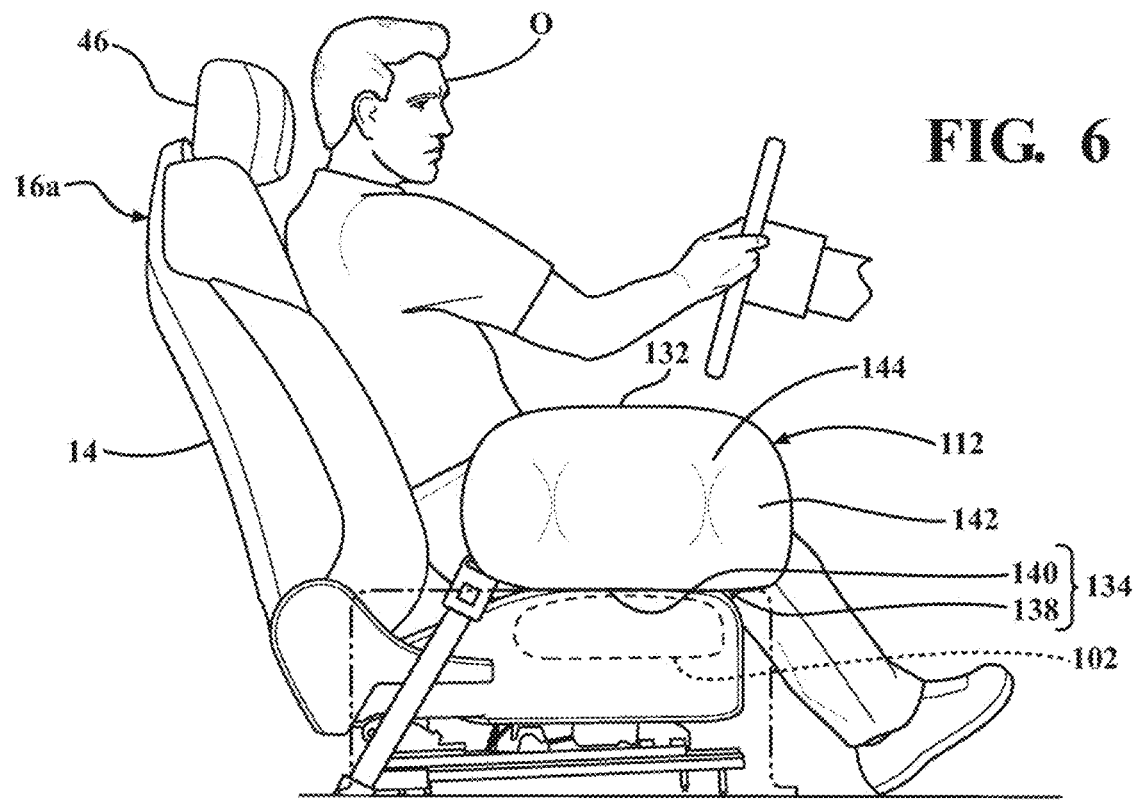
FIG. 6 is a front elevation view of the passenger compartment of FIG. 2, wherein the side impact mitigation system in a deployed state.

Referring to FIGS. 3, 4, and 7, the airbag module 102 includes—an airbag cushion 112 and an inflator module 114. In the illustrated example, the airbag cushion 112 is enclosed within an airbag wrap 110 in a folded state. The inflator module 114 is configured to receive an inflation trigger signal 115 (FIG. 9) from the vehicle body controller 18, and to discharge gas inside the airbag cushion 112 to inflate (deploy) the airbag cushion 112 (see FIGS. 3-6).

Referring to FIGS. 7 and 8, an example of the airbag module 102 according to the present disclosure is provided. As shown in FIG. 7, the airbag module 102 may include the wrap 110, which encloses the airbag cushion 112 and the inflator module 114. In some examples, the airbag cushion 112 may be packaged within the airbag wrap 110. Particularly, the airbag wrap 110 retains the airbag cushion 112 in a properly folded configuration when the airbag cushion 112 is in the un-deployed or un-inflated state within the wrap 110. Thus, the airbag wrap 110 facilitates a desired deployment pattern of the airbag cushion 112.

The airbag module 102 may further include an airbag deployment guide chute 118 that guides the airbag cushion 112 out of the seat 16*a* when the airbag cushion 112 is deployed. For example, the airbag deployment guide chute 118 may include a first end 120 attached to the wrap 110 and a second end 122 attached to the seat base cover 66 at a predetermined deployment region of the seat base cover 66. In the illustrated example, the second end 122 of the airbag deployment guide chute 118 is attached at the peripheral seam 72 formed between the upper seat base cover 68 and the peripheral seat base cover 70. For instance, the airbag deployment guide chute 118 may include a first fabric panel 124 attached to the upper seat base cover 68 at the peripheral seam 72 and a second fabric panel 126 attached to the peripheral seat base cover 70 at the peripheral seam 72. Thus, the fabric panels 124, 126 of the airbag deployment guide chute 118 attach to the respective seat base covers 68, 70 on opposite sides of the peripheral seam 72 to provide a conduit or passageway 128 from the wrap 110 to the peripheral seam 72. In use, the airbag deployment guide chute 118 guides the airbag cushion 112 through the peripheral seam 72 during deployment (FIG. 4). In other words, the peripheral seam 72 defines the deployment region of the seat 16a.

With reference to FIG. 8, the airbag cushion 112 may be described as including a proximal end 130 adjacent to the airbag inflator module 114 and a distal end 132 formed at an opposite end of the airbag cushion 112 than the airbag inflator module 114. An inboard side (i.e., configured to face the center console 30) of the airbag cushion 112 is preformed with a center console interface 134 between the proximal end 130 and the distal end 132. The center console interface 134 is configured to interface or mate with the center console 30 to support the airbag cushion 112 against the center console 30 under the side forces $F_O$ associated with inboard acceleration $A_O$ of the occupant O during a far-side impact event. Generally, the center console interface 134 may be described as defining a recess or socket along a bottom side of the airbag cushion 112 that mates with the console top surface 34 and a respective one of the side walls 36, 38.

As shown in FIG. 8, the airbag cushion 112 includes an outboard cushion panel 136 configured to face the occupant O when the airbag cushion 112 is deployed. The outboard cushion panel 136 may extend continuously from the proximal end 130 at the seat base 42 to the distal end 132 of the airbag cushion 112, and may include one or more preformed contours corresponding to the profile of the body of the occupant O. The airbag cushion 112 further includes a plurality of inboard cushion panels 138, 140, 142 formed on an opposite side of the airbag cushion 112 from the outboard cushion panel 136. The inboard cushion panels 138, 140, 142 are arranged in series from the proximal end 130 to the distal end 132 and cooperate to define the center console interface 134 of the airbag cushion 112.

Referring still to FIG. 8, the inboard cushion panels 138, 140, 142 include a lower inboard cushion panel 138, one or more intermediate inboard cushion panels 140, and an upper inboard cushion panel 142. In this example, the lower inboard cushion panel 138 is configured to interface with one of the side walls 36, 38 of the center console 30 when the airbag cushion 112 is deployed. For example, where the airbag cushion 112 is associated with the driver side front seat 16a, the lower inboard cushion panel 138 is formed to abut the driver-side wall 36 of the center console 30. The upper inboard cushion panel 142 extends between the one or more intermediate inboard cushion panels 140 and the distal end 132 and cooperates with an upper portion of the outboard cushion panel 136 to define an upper cushion body 144 that generally absorbs inboard forces $F_O$ associated with the body of the occupant O during a far-side impact event.

The one or more intermediate inboard cushion panels 140 extend between the lower inboard cushion panel 138 and the upper inboard cushion panel 142 and are configured to interface with the console top surface 34 to support the airbag cushion 112 in the deployed state. Thus, while the illustrated example shows the console top surface 34 as being a substantially planar feature, whereby the intermediate inboard cushion panel 140 has a corresponding substantially planar profile, the intermediate inboard cushion panel 140 may be preformed with other profiles to conform to the console top surface 34. For example, where the console top surface 34 includes unique geometries associated with features of the center console 30 (e.g., gear shifters, storage bins, cup holders), the intermediate inboard cushion panel 140 may be preformed (or include a plurality of intermediate inboard cushion panels 140) to include a corresponding profile configured to mate with the geometries of the console top surface 34.

The one or more intermediate inboard cushion panels 140 and the lower inboard cushion panel 138 cooperate to define the center console interface 134 of the airbag cushion 112. When the airbag cushion 112 is inflated, the center console interface 134 is configured to deploy immediately adjacent to the console top surface 34 and the driver-side wall 36 to minimize gaps or spaces between the inboard side of the airbag cushion 112 and the center console 30 prior to the application of external forces (e.g., force $F_O$ of the occupant body) to the airbag cushion 112. Thus, the center console 30 provides a support structure for the airbag cushion 112 and minimizes deflection (i.e., unsupported movement) of the airbag cushion 112 during the far-side impact event. By providing the airbag cushion 112 with the center console interface 134, side impact forces $F_O$ associated with the body of the occupant O are better supported and absorbed by the airbag cushion 112 during the side impact event compared to generic airbags (i.e., no pre-formed center console interface) that must deflect or conform to the console during the far-side impact event.

Referring to FIGS. 8 and 9, each passenger side front seat 16a, 16b may optionally include an associated inflator 104, which includes memory hardware 106 and a central processing unit 108 in communication with the inflator module 114, the vehicle body controller 18, and/or one or more of the collision sensors 24. The inflator 104 may receive or generate a trigger signal 115 that instructs the actuation of the inflator module 114 to deploy the airbag cushion 112. Particularly, when vehicle body controller 18 determines that forces measured by the collision sensors exceed a collision force threshold corresponding to a side collision event, the vehicle body controller 18 sends a trigger signal 115 to the inflator 104 that instructs the deployment to the inflator module 114.

FIGS. 3-6 illustrate the deployment of a side-impact airbag cushion 112 when the vehicle 10 is in a far-side impact event that causes the body of the occupant O to accelerate $A_O$ inboard relative to the vehicle body 12. For example, a side impact force $F_{SI}$ to the passenger side of the vehicle body 12 generally causes the vehicle body 12 to accelerate $A_{SI}$ towards the driver side of the vehicle 10. As the vehicle body 12 accelerates towards the driver side of the vehicle body 12, the lateral forces $F_{SI}$ associated with the side impact is indirectly transferred to the body of the occupant O through the seat body 40. However, the acceleration $A_{SI}$ of the vehicle body 12 and the seat body 40 may not fully transfer to the occupant O, whereby the torso of the occupant O lags behind the acceleration of the vehicle body 12 and moves in a relative direction opposite to the side-impact acceleration $A_{SI}$. Thus, the body of the occupant O may accelerate $A_O$ relative to the vehicle body 12 in a direction towards the centerline of the vehicle body 12 and towards the center console 30. As shown in FIG. 4, the resultant side-impact force $F_{SI}$ is directed to the outboard side relative to the vehicle body 12, and therefore, the occupant O may accelerate in the opposite direction towards the inboard side to cause a collision between the occupant O and the center console 30.

When a far-side impact event occurs and the side impact force $F_{SI}$ exceeds the side impact threshold, the vehicle body controller 18 and/or the inflator 104 generates a the trigger signal 115 and instructs the inflator module 114 to deploy the airbag cushion 112 to cover the driver-side wall 36 of the center console 30. Upon deployment of the airbag cushion 112, inboard forces $F_O$ associated with the body of the occupant O are absorbed by the airbag cushion 112. Thus, lateral acceleration $A_O$ of the body of the occupant O is at least partially restrained by the airbag cushion 112, and particularly, by the airbag cushion body 144. As discussed previously, providing the airbag cushion 112 with the pre-formed center console interface 134 allows the airbag cushion 112 to engage or mate with the center console 30 to minimize relative movement between the deployed airbag cushion 112 and the center console 30, thereby providing increased lateral support relative to airbag cushions formed without a center console interface.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A motor vehicle including an impact mitigation system comprising:

a seat including a seat base configured to support a lower body of an occupant, the seat base including (i) a seat base cushion enclosed within a seat base cover having an upper seat base cover and a peripheral seat base cover attached to the upper seat base cover along a peripheral seam, and (ii) a seat cushion side bolster defined by the upper seat base cover and the peripheral seat base cover;

a center console disposed adjacent to the seat cushion side bolster;

an airbag wrap disposed within the seat cushion side bolster;

an airbag deployment guide chute including (i) a first panel attached to the airbag wrap and the upper seat base cover at the peripheral seam and (ii) a second panel attached to the airbag wrap and the peripheral seat base cover at the peripheral seam; and an airbag cushion operable between an un-deployed state within the airbag wrap and a deployed state extending upwardly through the airbag deployment guide chute and from the peripheral seam of the seat cushion side bolster to provide a cushioning interface between the seat cushion side bolster and the center console, the airbag cushion including (i) an outboard cushion panel extending from a proximal end of the airbag cushion at the airbag wrap to a distal end of the airbag cushion disposed at an opposite end of the airbag cushion from the proximal end, and (ii) a plurality of inboard cushion panels including (a) a lower inboard cushion panel extending adjacent to the center console from the peripheral seam at the proximal end of the airbag cushion, (b) an intermediate inboard cushion panel extending from the lower inboard cushion panel and preformed to conform to a top surface of the center console, and (c) an upper inboard cushion panel extending between the intermediate inboard cushion panel and the distal end of the airbag cushion, wherein the lower inboard cushion panel and the intermediate inboard cushion panel cooperate to define a center console interface configured to mate with the center console in the deployed state.

2. The impact mitigation system of claim 1, wherein the side bolster includes a first seat cover and a second seat cover attached together at a seam.

* * * * *